(12) United States Patent
Coronel

(10) Patent No.: US 7,544,144 B2
(45) Date of Patent: Jun. 9, 2009

(54) GEARED-NEUTRAL BIDIRECTIONAL POSITIVELY INFINITELY VARIABLE ROTARY MOTION TRANSMISSION

(76) Inventor: Paul Kay Coronel, 295 U.S. Highway 49 South, Tutwiler, MS (US) 38963-5072

( * ) Notice: Subject to any disclaimer, the term of this patent is extended or adjusted under 35 U.S.C. 154(b) by 574 days.

(21) Appl. No.: 11/207,415

(22) Filed: Aug. 22, 2005

(65) Prior Publication Data

US 2007/0042857 A1    Feb. 22, 2007

(51) Int. Cl.
*F16H 37/02* (2006.01)
(52) U.S. Cl. .................. 475/207; 475/295; 475/302
(58) Field of Classification Search .......... 475/207, 475/208, 209, 295, 302
See application file for complete search history.

(56) References Cited

U.S. PATENT DOCUMENTS 5,259,823 A * 11/1993 Coronel ................ 475/257
6,502,472 B2 * 1/2003 Hewatt .................. 74/5 R

* cited by examiner

*Primary Examiner*—David D. Le

(57) ABSTRACT

A geared disk driven by a repositionable drive gear, with two independent and concurrent axes of rotation; both axes rotating and orbiting on one plane, about the transmission's central axis. The first axis of rotation being the gear's center. The second user-actuated axis of rotation concurrently varying its motive pivot point between the disk's center and edge, while concentrically transversing around the disk, to infinitely variably swing the disk gear. This variable swing motion is mechanically extracted and cycled through the transmission to progressively compound the combined motions to modify and sustain user-selected, infinitely variable, output speeds. Two interconnecting, clutch-free, geared-neutral, bidirectional, output mechanisms are included; one integrated within the transmission, and one separated from the transmission, to produce a continuously engaged, all-geared, complete range of transmission functions.

19 Claims, 4 Drawing Sheets

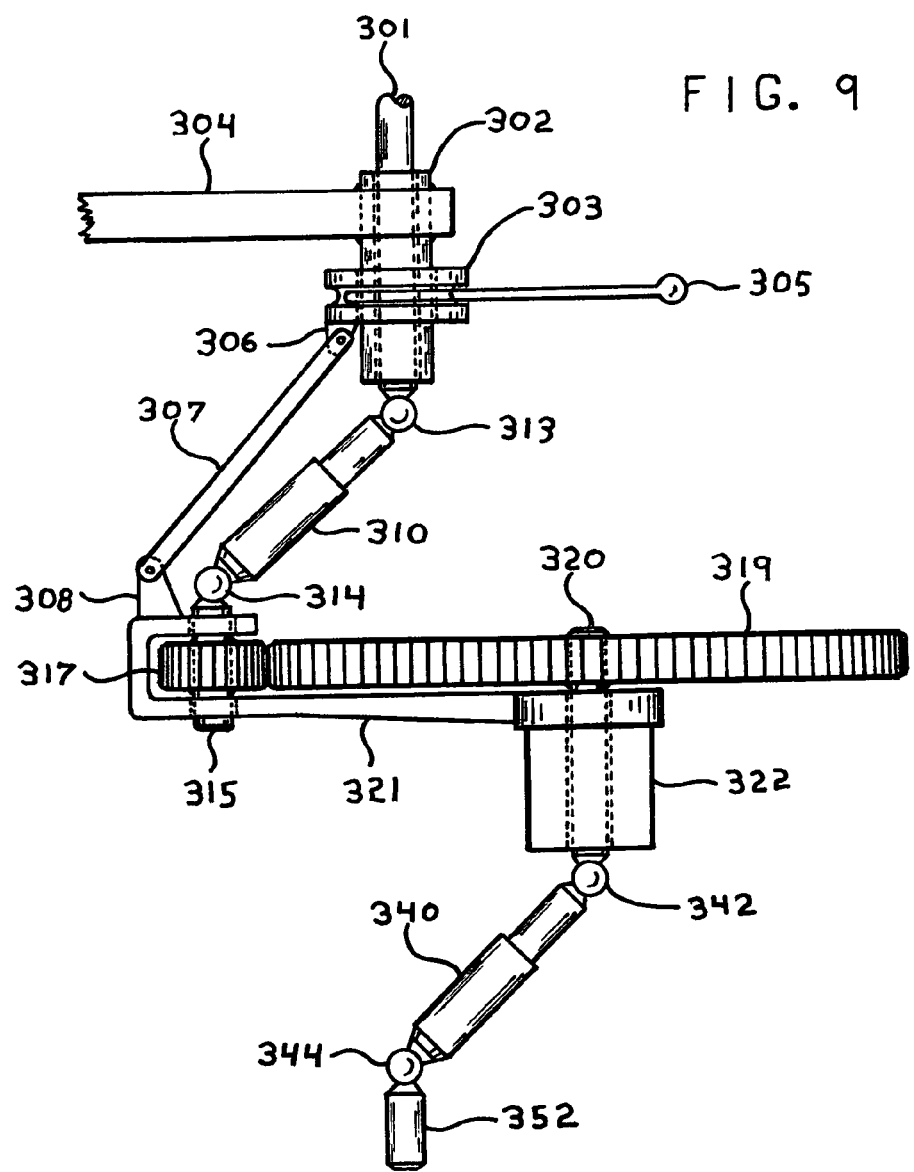

GEARED-NEUTRAL BIDIRECTIONAL POSITIVELY INFINITELY VARIABLE ROTARY MOTION TRANSMISSION

TECHNICAL FIELD

This disclosure relates the transmission of angular velocity, specifically to its mechanical transmission through a continuously engaged gear train including a gear-driven disk gear simultaneously rotating and orbiting about the mechanism's central axis to produce both a first non-varying component of rotational motion and a user-actuated second variable component of rotational motion which mechanically combine to infinitely vary the mechanism output.

BACKGROUND ART

The modern need for rotary motion transmission devices originated with the introduction of internal combustion engines producing narrow ranges of high power output. Two forms of rotary motion transmissions appeared: (1) continuously infinitely variable traction devices, and (2) geared multiple-ratio shifting mechanisms. Both forms experienced serious limitations.

Multiple ratio gear boxes require clutching mechanisms to interrupt drive continuity during ratio shifting. Therefore the mechanisms must incorporate ablative friction clutches or fluid torque converters which have limited life spans, exhaust generated energy, and are mechanically complex.

Infinitely variable devices are preferable since they are capable of being varied to the exact desired ratio. Therefore, efforts are continuing to perfect what the industry has labeled continously variable transmission ("CVT") designs. Continuing efforts are primarily limited to CVT V-belts and variable roller-toroid designs. Both experience limitations in traction, lubrication, and premature friction-induced failure.

All-gear positively infinitely variable transmission devices utilizing non-varying orbital components have been patented, all possessing serious limitations precluding their industrial adoption. These include U.S. Pat. No. 5,308,293 (Han 1994); U.S. Pat. No. 4,854,190 (Won 1989).

Positively infinitely variable transmission devices utilizing variable orbital components have also been patented. These include U.S. Pat. No. 5,352,162 (Coronel 1994) and U.S. Pat. No. 5,718,652 (Coronel 1998). The '162 patent, as with the present disclosure, utilizes a disk gear to variably orbit the mechanism's central axis to track variable circular gear paths. The '652 patent utilizes a tilting disk gear to track variable circular gear paths. Both devices failed due to their inability to isolate, extract, and transfer as output the variable rotational product. They simply exchange two inverse varying products, each of which cancelled the other. However, both devices taught the feasibility of mechanically utilizing one gear to establish variable diameter gear tracks capable of transferring varying angular velocity.

BRIEF DESCRIPTION OF THE DRAWINGS

The Drawing Figures

The relative sizes of the gearing and other components depicted within the drawing figures may vary depending upon the application of the transmission and its selected gear ratios.

FIG. 9 shows a frontal view of an alternative input actuating mechanism for the transmission of FIG. 1.

OBJECTIVES OF THE INVENTION

Figures 1, 2, 3, 4:
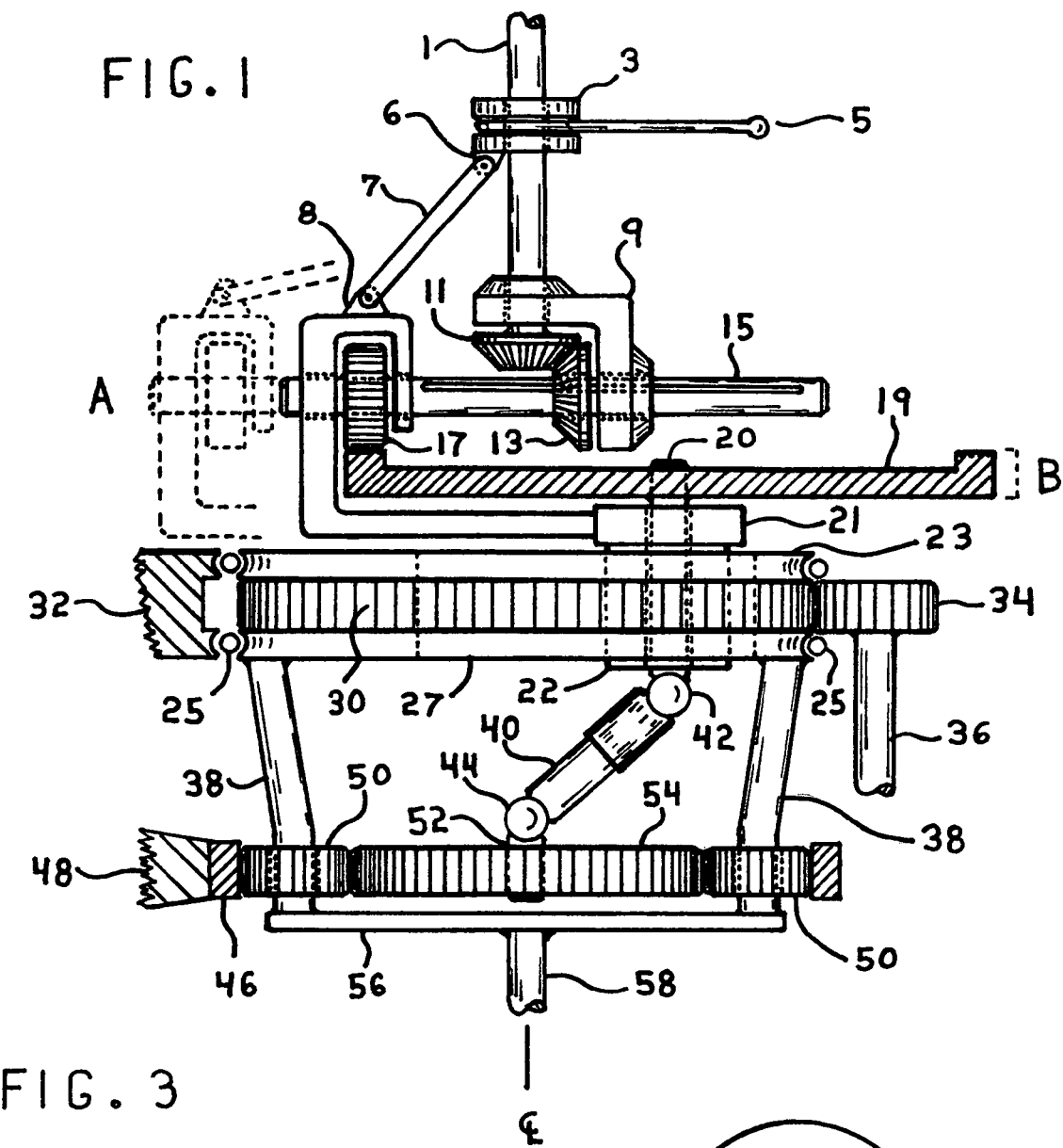
FIG. 1 shows a frontal view of the positively infinitely variable transmission including the user-operated actuator and dual high speed and low speed output shafts.
FIG. 2 shows a top view of the core unit of the combined central core gear and two bearing races. The vertically bored slot for lateral repositioning of the sliding driver to actuate speed changes is also depicted.
FIG. 3 is a top view of the orbital drive gear's track as it drives around the actual, non-swinging diameter of the variable orbital disk gear when the disk gear is in alignment with the mechanism central axis generating slow speed output. The $t_1$ of FIG. 3 represents an amount of time, X, utilized to compare angular differences in orbital drive gear tracking at the mechanism's slow speed operational configuration.
FIG. 4 is a top view of the orbital drive gear's track as it drives around the disk gear's mechanically induced smallest circular track created by repositioning the orbiting disk gear away from the central axis, generating concurrent disk gear orbital swing during transition to the mechanism's high speed operational configuration. The $t_2$ of FIG. 4 represents an equal amount of time, X, utilized to demonstrate progressively increasing angular orbital drive gear tracking during the mechanism's transition to its high speed operational configuration. The concurrent disk gear orbital swing generated during $t_2$ is further depicted.

The objectives of the mechanism include the mechanical inception of the following advantages:

1. An all-geared positively infinitely variable rotary motion transmission.

2. A gear train utilizing one gear-driven disk gear to generate two rotational motion components: (1) gear-driven disk gear rotation, and (2) user-actuation variable disk gear swing motion which is isolated, extracted, then combined with the first motion to produce a positively infinitely variable rotary motion output.

3. A transmission which increases the efficiency of the transfer of power from the motor to the vehicle wheels to increase fuel conservation and decrease pollution.

4. A positively infinitely variable transmission which is actuated without injections or extractions of rotary motion.

5. A geared-neutral bidirectional positively infinitely variable transmission eliminating the need for ablative friction clutches, hydraulic torque converters, or drive train disengagement and reverse gearing.

6. A separate geared-neutral, bidirectional mechanism for interconnection to other positively infinitely variable transmissions.

6. A positively infinitely variable transmission with an internal reversing mechanism.

BRIEF DESCRIPTION OF THE NUMBERED PARTS WITHIN THE DRAWING FIGURES

1 Input Shaft
3 Transition Actuator
5 Control Lever

6 Linkage Mount
7 Transition Linkage
8 Linkage Mount
9 Orbital Alignment Support
11 Input Transfer Gear
13 Input Receiving Gear
15 Orbital Drive Shaft
17 Orbital Drive Gear
19 Variable Orbital Disk Gear
20 Disk Gear Shaft
21 Variable Orbital Driver Arm
22 Sliding Driver
23 Bearing Race
25 Bearings
27 Bearing Race
30 Central Core Gear
32 Core Mount
34 Output Receiving Gear
36 High Speed Output Shaft
38 Core Drive Shaft
40 Telescoping Shaft
42 Universal Joint
44 Universal Joint
46 Planetary Ring Gear
48 Planetary Gear Mount
50 Planet Gear
52 Sun Gear Shaft
54 Sun Gear
56 Output Shaft Support
58 Low Speed Output Shaft
102 Input Drive Gear
104 Input Transfer Gear
106 Axle Shaft
108 Constant Speed Transfer Gear
110 Connecting Shaft
112 Input Drive Gear
114 Bidirectional Transfer Gear
116 Variable Drive Gear
117 Bidirectional Idler Shaft
118 Bidirectional Output Gear
120 Output Receiving Gear
122 Bidirectional Output Shaft
124 Variable Speed Transfer Gear
126 Connecting Shaft
150 Bidirectional Input Drive Gear
155 Transfer Shaft
156 Bored Bearing
160 Variable Receiving Gear
162 Bored Variable Drive Gear
164 Variable Transfer Gear
166 Output Receiving Gear
168 Bidirectional Output Shaft
201 Input Shaft
205 Input Gear
210 Directional Bearing
211 Input Transfer Gear
212 Directional Lever
213 First Direction Input Receiving Gear
214 Second Direction Input Receiving Gear
215 Directional Fork
216 Guide shaft
217 Directional Shaft
218 Guide Slot
220 Lateral Actuator
225 Sliding Dog
230 Dog Teeth
235 Twin Alignment Support
240 Key
301 Input Shaft
302 Input Shaft Sleeve
303 Transition Actuator
304 Sleeve Mount
305 Control Lever
306 Linkage Mount
307 Transition Linkage
308 Linkage Mount
310 Telescoping Shaft
313 Universal Joint
315 Drive Gear Shaft
317 Orbital Drive Gear
319 Variable Orbital Disk Gear
320 Disk Gear Shaft
321 Variable Orbital Driver Arm
322 Sliding Driver
340 Telescoping Shaft
342 Universal Joint
344 Universal Joint
352 Sun Gear Shaft

MODES FOR CARRYING OUT THE INVENTION

Construction of the Invention

During construction of the positively infinitely variable transmission of FIG. 1, the input shaft 1 is positioned at the mechanism's central axis (C/L) and journaled through supporting framework with its first end fixed to a driving motor (not shown). Centrally bored transition actuator 3 vertically slides upon input shaft 1, is horizontally slotted around its outer central circumference, and has linkage mount 6 attached to its second end edge. The first end of control lever 5 slides within the outer circumferential slot to vertically reposition transition actuator 3.

During operation of the alternative input actuating mechanism of FIG. 9, rotation of input shaft 301 drives the variable orbital disk gear 319 through the orbital drive gear 317, shaft 315, telescoping shaft 310 and universal joints 313 & 314. Rotation of the variable orbital disk gear 319 drives the sun gear shaft 352 through the telescoping shaft 340 and universal joints 342 & 344. Concurrently, the variable orbital disk gear 319, the orbital drive gear 317, shaft 315, telescoping shaft 310, universal joint 314, and the driver arm 321 orbit the central axis of the transmission.

Vertical movement of control lever 305 raises or lowers the transition actuator 303 to reposition the transition linkage 307 and slide the sliding driver 322 within the contiguous slot of the core unit parts 30, 23, & 27 of FIGS. 1 & 2. This repositions the concurrently rotating and orbiting components around the mechanism central axis.

Orbital Alignment Support 9 is constructed with two bearing bores positioned at right angles to one another. The second end of input shaft 1 is journaled through the first bearing bore of orbital alignment support 9 and attached to input transfer gear 11.

Sliding orbital drive shaft 15 has a milled longitudinal keyway, and is journaled through the second end of bearing bore of orbital alignment support 9. Input receiving gear 13 is centrally bored and connected in a driven relation with input transfer gear 11, and a driving and horizontal sliding relation with orbital drive shaft 15: utilizing a key within its central bore to slide within the shaft 15 keyway. Centrally bored orbital drive gear 17 is attached near one end of orbital drive shaft 15.

Variable orbital driver arm 21 has a first end extending around orbital drive gear 17; the end horizontally bored to journal orbital drive shaft 15. Linkage mount 8 is attached to the top of the end of variable orbital arm 21. Oblong sliding driver 22 is attached to, and shares a contiguous vertical central bore with the base of the second end of variable orbital driver arm 21.

Disk gear shaft 20 is journaled through the contiguous central bores of variable orbital driver arm 21 and sliding driver 22. Variable orbital disk gear 19 is connected in a driven relation with orbital drive gear 17, and its central bore is attached to the first end of disk gear shaft 20. The second end of disk gear shaft 20 is attached to universal joint 42.

Central core gear 30 is attached to bearing race 23 on its first side, and attached to bearing race 27 on its second side to form the core unit. The core unit of parts 30, 23 & 27 rotates within framework 32 upon bearings 25. Two core drive shafts 38 are attached to, and depend from the second side opposing ends of the core unit of parts 30, 23 & 27. The core unit parts 30, 23 & 27 share a contiguous slot vertically bored through the core unit between the two core drive shafts 38. Sliding driver 22 laterally slides within this slot. The two ends of the first side of output shaft support 56 are attached to the second ends of core drive shafts 38. Low speed output shaft 58 is positioned at the mechanism's central axis (C/L) and attached to the center of the second side of output shaft support 56.

Output receiving gear 34 is connected in a driven relation with central core gear 30. High speed output shaft 36 is attached to the second end of output receiving gear 34.

Planetary ring gear 46 is centrally positioned around the mechanism central axis (C/L) and attached to supporting framework with planetary gear mount 48. Centrally bored sun gear 54 is positioned within ring gear 46 at the mechanism central axis (C/L). Sun gear shaft 52 is positioned at the mechanism central axis (C/L), attached to universal joint 44 on its first end, and attached to the sun gear 54 on its second end. Telescoping shaft 40 is attached to universal joint 42 on its first end and universal joint 44 on its second end. Two centrally bored planet gears 50 are each journaled about the second ends of core drive shafts 38, and connected in a driven relation with sun gear 54, and a driving relation with ring gear 46.

The first end of linkage 7 is pivotally attached to linkage mount 6, and its second end is pivotally attached to linkage mount 8, wherein: movement of transition actuator 3 repositions the variable orbital driver arm 21 and disk gear 19 between low speed output alignment with the mechanism central axis (C/L) at "A", and high speed output at "B" during all operating configurations.

While FIG. 1 depicts, and this specification describes the input receiving gear 13 positioned to the right of the mechanism central axis (C/L), the invention may be modified with the input receiving gear 13 positioned to the left of the mechanism central axis (C/L) This modification will permit the transmission to operate correctly with reverse direction input shaft 1 rotational input.

Figure 8:
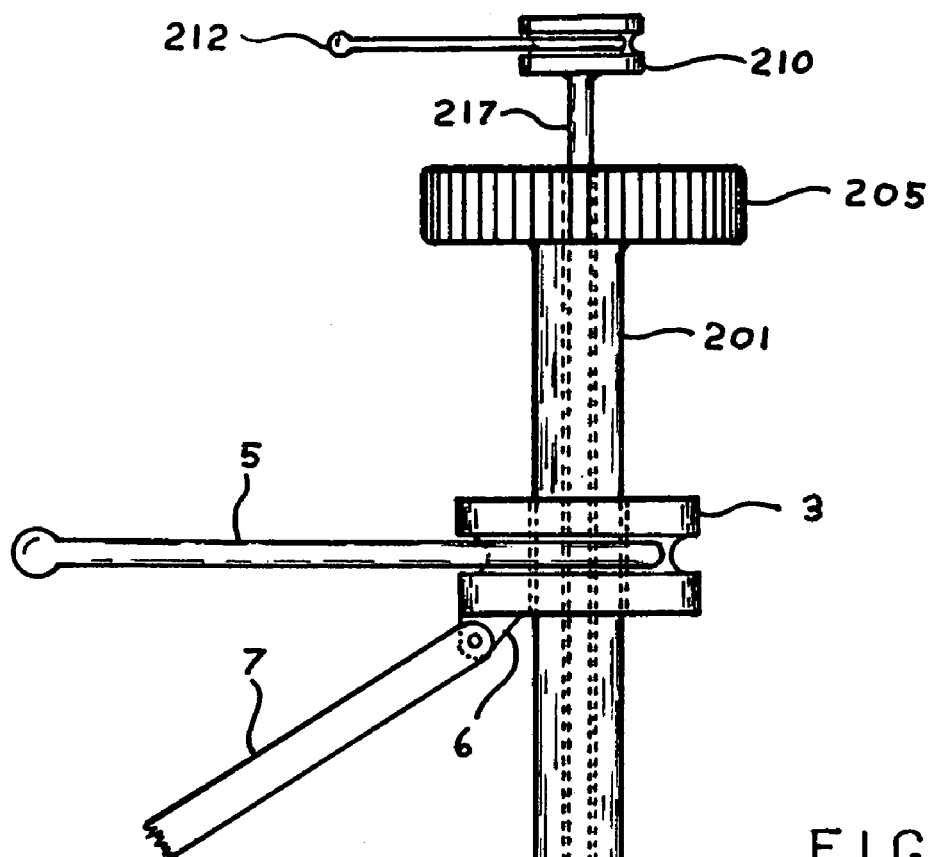
FIG. 8 shows a frontal view of the internal reverser of the transmission of FIG. 1.
Figure 8:
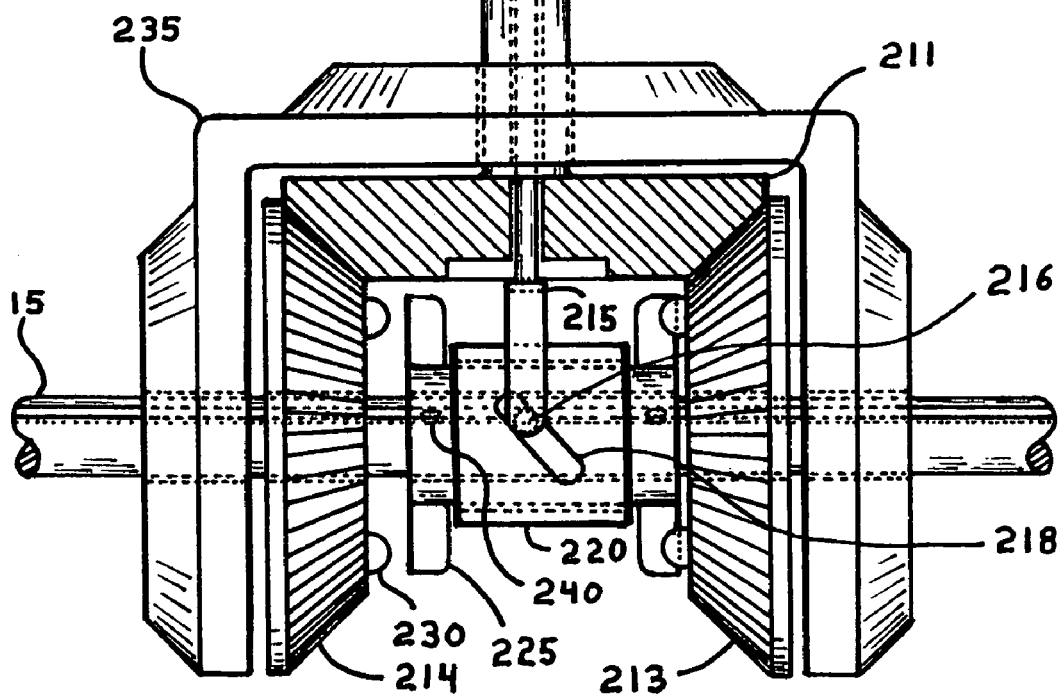

During construction of the transmission's internal reverser of FIG. 8 utilizing the modification, input gear 205 is attached to the first end of input shaft 201, and recessed input transfer gear 211 is attached to its second end. Shaft 201 and gears 205 & 211 share a contiguous central bore to support directional shaft 217.

Directional shaft 217 vertically travels within the contiguous central bore of shaft 201 and gears 205 & 211. Directional shaft 217 has directional bearing 210 attached to its first end, and directional fork 215 attached to its second end. Directional fork 215 is inverted "U" shaped with the first ends of two inward facing guide shafts 216 attached to the fork ends inner surfaces. Directional lever 212γ slides within the bearing 210 slot.

Twin alignment support 235 is inverted "U" shaped and constructed with a central top, two depending arms, and three bearing bores. One bearing bore is vertically positioned through the support 235 central top, and one bearing bore is laterally positioned through each of the two depending arms in alignment with each other.

The second end of input shaft 201 is journaled through the central support 235 top bearing bore and attached to input transfer gear 211. Orbital drive shaft 15 is journaled through both support 235 depending arm bearing bores.

First direction input receiving gear 213 is journaled upon the orbital drive shaft 15, positioned adjacent to the support 235 second depending arm, and connected in a driven relation to the input transfer gear 211. Second direction input receiving gear 214 is journaled upon the orbital drive shaft 15, positioned adjacent to the support 235 first depending arm, and connected in a driven relation with the input transfer gear 211. Receiving gears 213 and 214 each have one or more dog teeth 230 laterally extending from their inward facing surfaces.

Sliding dog 225 is laterally bored, and has one or more rigid vanes extending laterally from each end. Sliding dog 225 is positioned between the two receiving gears 213 & 214, and is journaled upon the output drive shaft 15 utilizing one or more inward extending keys 240 to slide laterally, and rotate with shaft 15.

Lateral actuator 220 is laterally bored and journaled upon the sliding dog 225 between the rigid vanes extending from each sliding dog 225 end. Lateral actuator 220 has two angled guide slots, one milled through its front and the second milled through its rear.

The directional fork 215 extends over the top of lateral actuator 220 with the second ends of its inward facing guide shafts 216 sliding within the guide slots 218.

Figure 5:
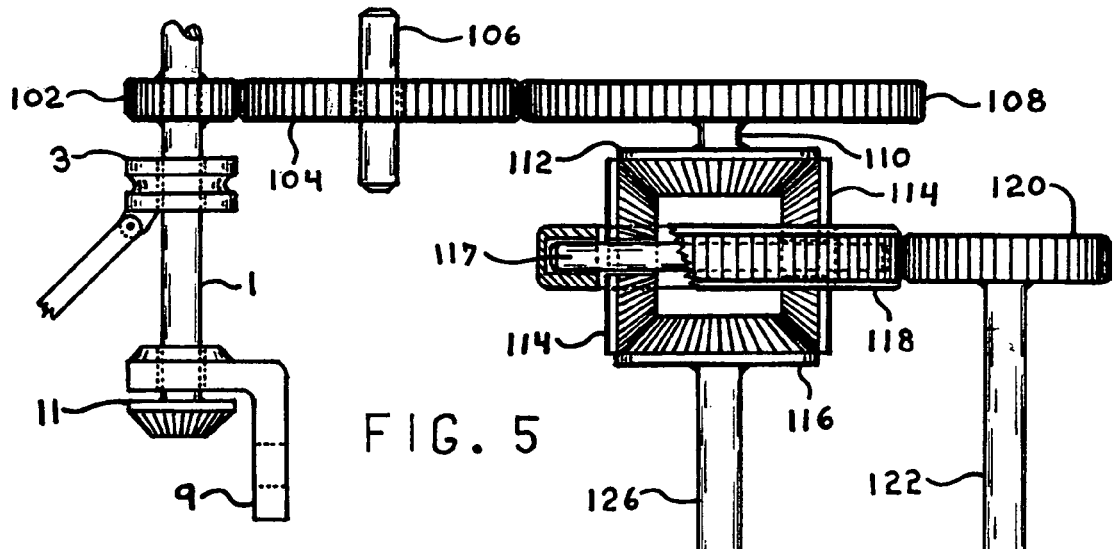
FIG. 5 shows a frontal view of the geared-neutral, positively infinitely variable transmission's interconnected bidirectional mechanism positioned outside the transmission.

During construction of the transmission's interconnected bidirectional mechanism positioned outside the transmission of FIG. 5, input drive gear 102 is attached to input shaft 1. Connecting shaft 110 is attached to input drive gear 112 on its first end, and attached to constant speed transfer gear 108 on its second end. Input transfer gear 104 is journaled to rotate around axle shaft 106, and is connected to the input drive gear 102 in a driven relation, and to constant speed transfer gear 108 in a driving relation.

Connecting shaft 126 is attached to variable drive gear 116 on its first end, and to variable speed transfer gear 124 on its second end. Variable speed transfer gear 124 is connected in a driven relation with the central core gear 30.

Two bidirectional transfer gears 114 are each journaled to rotate around opposite ends of bidirectional idler shaft 117, and are connected in driven relationships with both the input drive gear 112, and variable drive gear 116. Each end of bidirectional idler shaft 117 is journaled within opposing internal diameter bearings laterally bored within the bidirectional output gear 118; wherein unequal counterrotation of input drive gear 112 and variable drive gear 116 causes driving rotation of the bidirectional output gear 118 through both bidirectional transfer gears 114. Output receiving gear 120 is attached to bidirectional output shaft 122, and connected in a driven relation with the bidirectional output gear 118.

Figure 6:
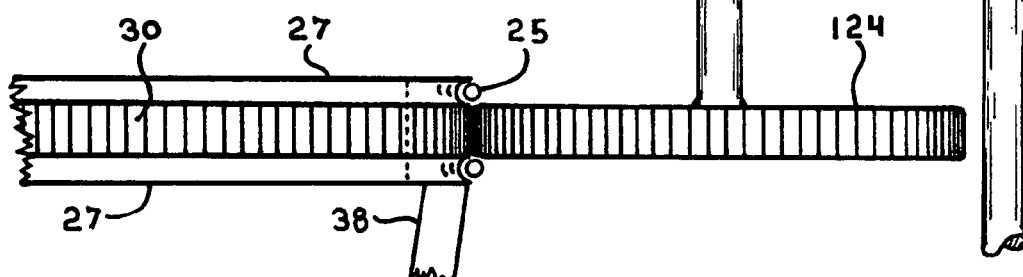
FIG. 6 shows a frontal view of the geared-neutral, positively infinitely variable transmission's interconnected bidirectional mechanism positioned within the transmission.
Figure 6:
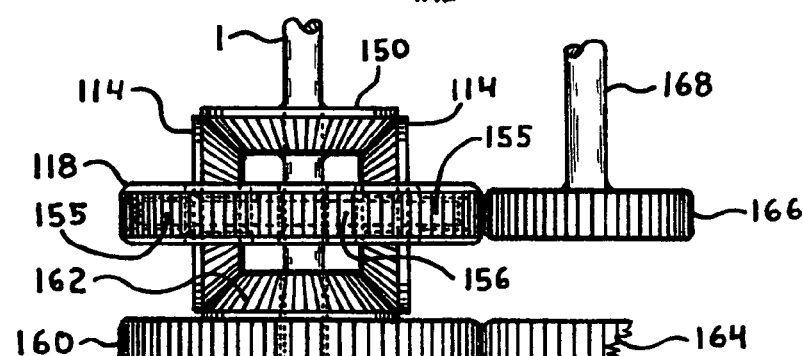
Figure 6:
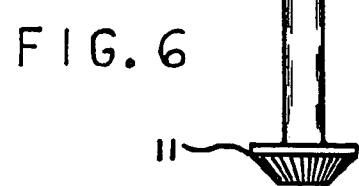

During construction of the transmission's interconnected bidirectional mechanism positioned within the transmission of FIG. 6, bidirectional input drive gear 150 is attached to input shaft 1. Bored variable drive gear 162 is attached to, and shares a contiguous central bore with variable receiving gear 160 for journaled rotation around the input shaft 1, and positioned below the bidirectional input drive gear 150. Variable transfer gear 164 is connected through a gear train (not shown) in a driven relation with the central core gear 30, and a driving relation with the variable receiving gear 160.

Figure 7:
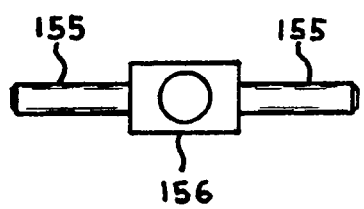
FIG. 7 is a top view of the transmission's integral geared-neutral bidirectional mechanism's bored bearing and transfer shaft.

Vertically bored bearing 156 of FIG. 7 is attached to two transfer shafts 155 laterally depending from opposite ends. Two bidirectional transfer gears 114 of FIG. 6 are each journaled to rotate around each transfer shaft 155. Both bidirectional transfer gears 114 are each connected in a driven relation with both the bidirectional input drive gear 150, and the bored variable drive gear 162. The transfer shaft 155 ends are journaled within opposing internal diameter bearings laterally bored within the bidirectional output gear 118; wherein unequal counterrotation of the bidirectional input drive gear 150 and the bored variable drive gear 162 causes driving rotation of the bidirectional output gear 118 through both bidirectional transfer gears 114. Output receiving gear 166 is attached to the bidirectional output shaft 168 and connected in a driven relation with the bidirectional output gear 118.

Operation of the Invention

During operation of the positively infinitely variable transmission of FIGS. 1 and 2, the driving motor (not shown) rotates variable orbital disk gear 19 through the orbital drive gear 17, orbital drive shaft 15, input receiving gear 13, input transfer gear 11, and input shaft 1.

When the variable orbital disk gear 19 rotates in alignment with the mechanism central axis (C/L) at "A", the orbital drive gear 17 tracks the actual variable orbital disk gear 19 diameter as depicted in FIG. 3. The disk gear 19 concurrently drives the planetary sun gear 54 through shafts 20 & 52, universal joints 42 & 44, and telescoping shaft 40. Rotation of sun gear 54 drives planet gears 50, core drive shafts 38, and the core unit (parts 30, 23 & 27) around the mechanism central axis (C/L) when operating at the mechanism's slow speed. This drives the two output shafts 36 and 58 at their slowest speeds, and additionally prevents the reversal or stalling of any mechanism components at start-up.

With user-actuated movement of control lever 5, variable orbital driver arm 21, attached sliding driver 22, and disk gear 19 are laterally repositioned about the core unit (parts 30, 23 & 27) away from the mechanism central axis (C/L). The driving of variable orbital disk gear 19 by the orbital driver gear 17 commences to track a smaller circular orbital path around the mechanism central axis (C/L) while the disk gear 19 commences progressive concentric orbiting as depicted in FIG. 4.

The concurrent disk gear 19 driving of sun gear 54 orbits planet gears 50, core drive shafts 38, core unit (parts 30, 23 & 27) around the mechanism central axis (C/L). This compels driver arm 21 to orbit orbital drive gear 17 during its driving of disk gear 19. As orbital driver gear 17 continues to drive disk gear 19 around the smaller circular orbital path, a second motion is increased with the commencement of the reduction of the diameter of concentric orbiting of disk gear 19 around the mechanism central axis.

This second induced motion is defined as concentric disk gear 19 swing. The $t_1$ of FIG. 3 depicts X amount of time that orbital drive gear 17 is driving at the full actual diameter track of disk gear 19 at the mechanism slow speed operational configuration. The $t_2$ of FIG. 4 also depicts the same X amount of time, but with orbital drive gear 17 now driving disk gear 19 at the mechanism's smallest diameter circular track, producing its full high speed operational configuration: but with the generation of continual induced disk gear 19 swing not present at $t_1$ when the disk gear 19 is aligned with the mechanism central axis (C/L). $t_1 = t_2$. The amount of continual induced concentric disk gear 19 swing is proportional to the extent of disk gear 19's repositioning away from the mechanism central axis (C/L). The further the center of disk gear 19 is from the mechanism central axis (C/L), the greater the amount of continual induced swing.

This continual induced swing is isolated, extracted, and transferred as additional rotation through enhanced swing rotation of the variable orbital arm 21, and attached sliding driver 22 to drive the core unit (parts 30, 23 & 27). Rotation of the core unit (parts 30, 23 & 27) concurrently accelerates and compound the swing speed (not the rotational speed) of disk gear 19 through core drive shafts 38, planet gears 50, sun gear 54, telescoping shaft 40, universal joints 42 & 44, and shafts 20 & 52. As the diameter of the concentric track of orbital drive gear 17's driving of disk gear 19 progressively decreases, swing speed (and compounding) progressively increase, accelerating the high speed output shaft 36 and low speed output shaft 58. Reversal of actuation progressively repositions the orbiting disk gear 19 towards the mechanism central axis, enlarging the concentric track of orbital drive gear 17's driving of disk gear 19, progressively decreasing swing speed, and progressively decelerating the velocity of the high speed output shaft 36 and the low speed output shaft 58.

During operation of the transmission's internal reverser of FIG. 8, the driving motor (not shown) counterrotates first direction input receiving gear 213 and second direction input receiving gear 214 through gears 205 & 211, and input shaft 201.

During construction of the alternative actuating mechanism of FIG. 9, input shaft 301 is journaled through the bored input shaft sleeve 302 which is attached to supporting framework with sleeve mount 304. The second end of input shaft 301 is attached to universal joint 313. The first end of telescoping shaft 310 is attached to universal joint 313, and its second end is attached to universal joint 314.

Sliding driver 322 is attached to the second end of variable orbital driver arm 321, and slides within the contiguous slot vertically bored through the core unit parts 30, 23, & 27 of FIGS. 1 & 2. Sliding driver 322 and attached second end of variable orbital driver arm 321 share a contiguous central bore to journal disk gear shaft 320.

Variable orbital disk gear 319 has gear teeth upon its exterior circumference and is centrally attached to the first end of disk gear shaft 320.

Drive gear shaft 315 is journaled through the "U" shaped arms of the first end of variable orbital driver arm 321. The first end of drive gear shaft 315 is attached to universal joint 314. Linkage mount 308 is attached to the top of the first end of "U" shaped variable orbital driver arm 321.

Bored transition actuator 303 vertically slides around the input shaft sleeve 302 and has linkage mount 306 attached to its second side edge. The first end of transition linkage 307 is pivotably attached to linkage mount 306, and its second end is pivotably attached to linkage mount 308. The first end of control lever 305 is "U" shaped to slide within the outer circumferential slot of transition actuator 303.

Bored orbital drive gear 317 is attached to drive gear shaft 315 and connected in a driving relation to the variable orbital disk gear 319.

The first end of telescoping shaft 340 is attached to universal joint 342, and its second end attached to universal joint 344. The first end of sun gear shaft 352 is attached to universal joint 344. The sun gear shaft 352 is attached to sun gear 54 of FIG. 1.

Lifting of directional lever 212 raises the directional bearing 210 and attached directional shaft 217 to slide the directional fork's 215 guide shafts 216 within guide slots 218. The rising guide shafts 216 laterally slide the lateral actuator 220 to drive the sliding dog 225 into the first direction receiving gear 213. The sliding dog's 225 laterally extending rigid vanes contact and lock onto the gear's 213 dog teeth to rotate the orbital drive shaft 15 and drive the transmission in a first direction through the sliding dog 225 and keys 240.

Lowering of directional lever 212 lowers the directional bearing 210 and attached directional shaft 217 to slide the directional fork's 215 guide shafts 216 within guide slots 218. The lowering guide shafts 216 laterally slides the lateral actuator 220 to drive the sliding dog 225 into the second direction receiving gear 214. The sliding dog's 225 laterally extending rigid vanes contact and lock onto the gear's 214 dog teeth to rotate the orbital drive shaft 15 and drive the transmission in a second direction through the sliding dog 225 and keys 240.

During actuation, the unit of gears 17, 19, and arm 21 undergo an effective modification of their orbital relation relative to the mechanism central axis (C/L) to create "swing" which is defined as follows:

With gear 17 revolving into disk gear 19 at a constant speed when in the low speed configuration, the primary pivot point is gear 19's alignment with the C/L. Gear 17 orbits gear 19 at the rate of X number of orbits. This driven rotation of gear 19 drives gear 30 through gears 46, 50, 54, axles 38, and arm 21 to sustain the low speed. $t_1$ of FIG. 3 depicts the slow speed orbital advancement.

With actuation, a second pivot point is induced within the unit of gears 17, 19, and arm 21, rotated at a slower speed by gear 30. As gear 19 leaves its alignment with the C/L, the commencement of swinging of this now offset unit by gear 30 about the C/L occurs. This generates the independent swing rate. Initially this rate is quite small, but it further accelerates the unit and gear 30, increasing gear 17's and the unit's orbital travel by the factor of Y (Y varying from 0 [at slow speed] to (infinity) [as 17 approaches C/L]). Gear 17 is now making X+Y orbits as it drives into gear 19 while continuing to revolve with the same number of revolutions. This enlarged orbital difference is the swing rate Gear 30 sustains the higher speed with its acceleration of the speed of gear 19 through axles 38, gears 46, 50, 54, and arm 21. Since disk gear 19 is driven by gear 17 revolving at a constant speed, the increase accelerates the orbital speed of gear 19 and arm 21. Gear 30 is accelerated through arm 21 to sustain gear 30's higher speed, and the transmission's increased output speed. $t_2$ of FIG. 4 depicts this high speed orbital advancement (Y being the difference between $t_1$ and $t_2$)

As rotational compounding initiates with the introduction of actuation and swing, further actuation exponentially compounds the rotary product.

During operation of the interconnected bidirectional mechanism positioned outside the transmission of FIG. 5, input shaft 1 rotation drives the input drive gear 112 in a first direction through the input drive gear 102, input transfer gear 104, the constant speed transfer gear 108, and the connecting shaft 110.

Variable speed transmission output from the central core gear 30 drives the variable drive gear 116 through the variable transfer gear 124, and connecting shaft 126, to counterrotate the variable drive gear 116 in a second opposite direction to the rotation of input drive gear 112.

Equal counterrotation of input drive gear 112, and variable drive gear 116, equally counterrotate both bidirectional transfer gears 114 to retain bidirectional idler shaft 117, bidirectional output gear 118, output receiving gear 120, and output shaft 122 in a geared-neutral, non-rotating position.

Variable drive gear 116 rotation exceeding the rotational velocity of input drive gear 112, drives the bidirectional idler shaft 117, bidirectional output gear 118, output receiving gear 120, and output shaft 122 in a first direction.

Variable drive gear 116 rotation less than the rotational velocity of input drive gear 112 drives the bidirectional idler shaft 117, bidirectional output gear 118, output receiving gear 120, and output shaft 122 in a second opposite direction.

During operation of the interconnected bidirectional mechanism positioned within the transmission of FIG. 6, input shaft 1 rotation drives the attached bidirectional input drive gear 150 in a first direction. Variable speed transmission output from the central core gear 30 (not shown) drives the bored variable drive gear 162 through the attached variable receiving gear 160, the variable transfer gear 164, and a gear train (not shown) to counterrotate the bored variable drive gear 162 in a second opposite direction to the rotation of bidirectional drive gear 150.

Equal counterrotation of the bidirectional input drive gear 150 and the bored variable drive gear 162, equally counterrotates both bidirectional transfer gears 114 to retain the bored bearing 156 & attached transfer shafts 155, bidirectional output gear 118, output receiving gear 166, and output shaft 168 in a geared-neutral, non-rotating position.

Bored variable drive gear 162 rotation exceeding the rotational velocity of bidirectional input drive gear 150, drives the bored bearing 156 & attached transfer shafts 155, the bidirectional output gear 118, output receiving gear 166, and bidirectional output shaft 168 in a first direction.

Bored variable drive gear 162 rotation less than the rotational velocity of bidirectional input drive gear 150 drives the bored bearing 156 & attached transfer shafts 155, the bidirectional output gear 118, output receiving gear 166, and output shaft 168 in a second opposite direction.

INDUSTRIAL APPLICABILITY

The invention has applicability to most mechanical mechanisms which produce or utilize rotary motion, or would benefit from variable speed rotational motion. The prominent period urgent applications for the invention are: the replacement of conventional multi-step manual and hydraulic shifting transmissions to permit smaller energy efficient fossil-fueled motors to operate at higher peak power speeds conserving the fuel and operating with a more efficient angular velocity variation and transfer, eradicating conventional transmission limitations of mechanical complexity and energy waste; the opening of new industrial and vehicular applications for variable speed changing applications which are unable to utilize multi-step shifting transmissions, but could benefit from this device, such as aviation and marine drives, water and wind electric generating drives, endless conveyor belts, home appliances, etc. Additional examples of existing applications for the invention include the replacement of all conventional motorized vehicular, machine tool, and industrial drive transmissions. Additional examples of new applications for the invention include conventional electric generation, pneumatic, and hydrostatic drive transmissions. The invention will replace processes not utilizing variations of input speed such as industrial machinery and inorganic drilling and cutting equipment. This will permit smaller energy efficient driving motors to operate at their maximum power generating speed with the transmission producing continuously engaged variation of operating, drilling or cutting speed. Fabrication of the invention is straightforward, utilizing existing geared mechanism designing and making equipment employed for the production of conventional transmissions. The invention is structurally strong capable of varying large torque loading, and is controllable either through direct manual actuation or existing computer-controlled electrical-mechanical servomotor interfaces employed in CVT mechanisms.

The invention claimed is:

1. A process for utilizing a variable orbiting gear driven disk gear to drive a core gear and high and low speed output shafts in a drive arrangement having an input shaft, an input receiving gear, an orbital drive gear, a repositionable orbital drive gear orbital drive shaft, a repositionable variable orbital disk gear, a repositionable variable orbital driver arm, said core gear, a planetary gear set including sun and planet gears, said high speed and low speed output shafts, a central axis defined by the input and low speed output shafts, a universally positionable connecting linkage, the process comprising the steps of:
    revolving said orbital drive gear and said repositionable variable orbital driver arm around said rotating repositionable variable orbital disk gear through said input receiving gear, said orbital drive gear, and said repositionable orbital drive gear orbital drive shaft;
    rotating said core gear and said high speed and low speed output shafts through the rotating said repositionable variable orbital driver arm;
    translating rotation of said repositionable variable orbital disk gear to drive said planetary gear set sun gear through said universally positionable connecting linkage;
    translating said sun gear rotation to concurrently rotate said core gear through said planetary gear set planet gears; and
    continuously changing the rotation speeds of said core gear, said high speed and low speed output shafts between predetermined minimum and maximum speeds with repositioning of said repositionable variable orbital disk gear relative to said central axis.

2. The process as claimed in claim 1 with said bidirectional output gear and a central axis, the process further comprises the step of revolving said bidirectional output gear around said central axis.

3. A process for utilizing an input shaft and a continuously changing rotation speed of a core gear to drive a bidirectional output gear in a drive arrangement having an input shaft drive gear, one or more input transfer gears, an input drive gear, a variable drive gear, one or more variable speed transfer gears, one or more bidirectional transfer gears, a bidirectional idler shaft, an output receiving gear, and an output shaft, the process comprising the steps of:
    driving said input drive gear in a first direction of rotation through said input shaft, said input shaft drive gear, and said one or more input transfer gears;
    driving said variable drive gear in a second direction of rotation through said continuously changing rotational speeds of said core gear, and said one or more variable speed transfer gears;
    translating said input drive gear in said first direction, and said variable drive gear in said second direction to drive said bidirectional transfer gears, said bidirectional idler shaft, said bidirectional output gear, and said output shaft at a geared-neutral non-rotating velocity when said input drive gear first direction speed and said variable drive gear second direction speed are equal; and
    translating said input drive gear in said first direction, and said variable drive gear in said second direction to drive said bidirectional transfer gears, said bidirectional idler shaft, said bidirectional output gear, and said output shaft at infinitely variable bidirectional angular velocities when said input drive gear first direction speed and said variable drive gear second direction speed differ.

4. A gear train with a variable orbiting gear driven disk gear driving a central core gear, and high and low speed output shafts, in a drive arrangement having an input shaft, an input receiving gear, a orbital drive gear, a repositionable orbital drive gear orbital drive shaft, a variable orbital disk gear, a repositionable variable orbital driver arm, said core gear, a planetary gear set including sun and planet gears, said high speed and low speed output shafts, a central axis defined by the input and low speed output shafts, and a universally positionable connecting linkage;
    first revolving means to revolve said orbital drive gear and said repositionable variable orbital driver arm around said rotating variable orbital disk gear through said input receiving gear, said orbital drive gear, and said repositionable orbital drive gear orbital drive shaft;
    rotating means to rotate said core gear and said high speed and low speed output shafts through the rotation of said repositionable variable orbital driver arm;
    first translating means to translate rotation of said variable orbital disk gear to drive said planetary gear set sun gear through said universally positionable connecting linkage;
    second translating means to translate said sun gear rotation to concurrently rotate said core gear through said planetary gear set planet gears; and
    continuously changing means to continuously change the rotation speed of said core gear, said high speed and low speed output shafts between predetermined minimum and maximum speeds with repositioning of said variable orbital disk gear relative to said central axis.

5. The gear train as claimed in claim 4 utilizing said input shaft and said continuously changing rotation speeds of said core gear to drive a bidirectional output gear in a drive arrangement having an input shaft drive gear, one or more input transfer gears, an input drive gear, a variable drive gear, one or more variable speed transfer gears, one or more bidirectional transfer gears, a bidirectional idler shaft, an output receiving gear, and an output shaft;
    first driving means to drive said input drive gear in a first direction of rotation through said input shaft, said input shaft drive gear, and said one or more input transfer gears;
    second driving means to drive said variable drive gear in a second direction of rotation through said continuously changing rotational speed of said core gear, and said one or more variable speed transfer gears;
    third translating means to translate said input drive gear in said first direction, and said variable drive gear in said second direction to drive said bidirectional transfer gears, said bidirectional idler shaft, said bidirectional output gear, and said output shaft at a geared-neutral non-rotating velocity when said input drive gear first direction speed and said variable drive gear second direction speed are equal; and
    said third translating means to translate said input drive gear in said first direction rotation, and said variable drive gear in said second direction rotation to drive said bidirectional transfer gears, said bidirectional idler shaft, said bidirectional output gear, and said output shaft at infinitely variable bidirectional angular velocities when said input drive gear first direction speed and said variable drive gear second direction speed differ.

6. The gear train as claimed in claim 5 utilizing said bidirectional output gear and said central axis, comprising:
second revolving means to revolve said bidirectional output gear around said central axis.

7. The gear train as claimed in claim 6, where the second revolving means to revolve the bidirectional output gear around the central axis includes:
a bidirectional input drive gear attached to and rotating with said input shaft aligned with said central axis; and
a bored variable drive gear rotating around said central axis, connected with a connecting means through said one or more bidirectional transfer gears and a transfer shaft to a positively infinitely variable transmission's continuously speed changing output core or shaft.

8. The gear train as claimed in claim 7, including said planetary gears drive said core gear through attached core gear shafts.

9. A gear train having an infinitely variable transmission producing and manipulating variable orbiting gear driven disk gear, an input shaft, a low speed output shaft, a high speed output shaft, a central axis defined by the input shaft and the low speed output shaft;
driving means utilizing an orbital drive gear to drive said variable orbiting gear driven disk gear, and a repositionable variable orbital driver arm, around said central axis;
said variable orbiting gear driven disk gear connected in a driving relation to a planetary gear set sun gear, with universally connecting linkage means;
said repositionable variable orbital driver arm repositionably connected in a driving relation to a core gear;
said planetary gear set sun gear connected in a driving relation with one or more planetary gear set planet gears;
wherein the variable orbiting gear driven disk gear rotation drives said core gear, said low speed output shaft, and said high speed output shaft through said planetary gear set sun and planet gears;
repositioning means to reposition said variable orbiting gear driven disk gear, and said variable orbital driver arm, in relation to said central axis; and
wherein the repositioning of said variable orbiting gear driven disk gear and said variable orbital driver arm infinitely varies rotational speeds of said core gear, said high speed and low speed output shafts between predetermined minimum and maximum speeds.

10. The gear train as claimed in claim 9 with an interconnected bidirectional gear train, including:
first interconnecting means to drive an input drive gear in a first direction of rotation through said input shaft;
second interconnecting means to drive a variable drive gear in a second direction of rotation through continuously changing rotational speed of said core gear;
translating means to translate said input drive gear in said first direction, and said variable drive gear in said second direction, to drive one or more bidirectional transfer gears, a bidirectional idler shaft, a bidirectional output gear, and an output shaft at a geared-neutral, non-rotating velocity, when input drive gear first direction speed and variable drive gear second direction speed are equal; and
said translating means to translate said input drive gear in said first direction, and said variable drive gear in said second direction, to drive said bidirectional transfer gears, said bidirectional idler shaft, said bidirectional output gear, and said output shaft, at infinitely variable bidirectional angular velocities, when said input drive gear first direction speed and said variable drive gear second direction speed differ.

11. The gear train as claimed in claim 10, further including revolving means to revolve said bidirectional output gear around said central axis.

12. The gear train as claimed in claim 11, wherein the repositioning means to reposition the variable orbiting gear driven disk gear and variable orbital driver arm includes a transition actuator linked to said variable orbital driver arm.

13. The gear train as claimed in claim 12, wherein the revolving means to revolve the orbital drive gear and repositionable variable orbital driver arm around the rotating variable orbital disk gear includes an input transfer gear driving an input receiving gear repositionable laterally along an orbital drive shaft attached to an orbital driver gear.

14. The gear train as claimed in claim 13, wherein the universally connecting linkage means includes a telescoping shaft attached on each end with constant velocity universal joints.

15. The gear train as claimed in claim 14, wherein the interconnecting means to drive the input drive gear and the variable drive gear includes one or more gears attached to one or more gear shafts.

16. The gear train as claimed in claim 15, wherein the connection between the variable orbiting gear driven disk gear and the planetary gear set sun gear includes a disk gear shaft journaled through the contiguous bore of said variable orbital driver arm and a sliding driver, attached on said disk gear shaft's first end to said variably orbiting gear driven disk gear, and attached on said disk gear shaft's second end to said constant velocity universal joint.

17. A gear train to convert a positively infinitely variable rotary motion transmission to a geared-neutral bidirectional transmission, including:
a first interconnecting means to drive an input drive gear in a first direction through said positively infinitely variable rotary motion transmission's constant velocity input shaft;
a second interconnecting means to drive a variable drive gear in a second direction through said positively infinitely variable rotary motion transmission's continuously changing rotational speeds of an output shaft;
translating means to translate said input drive gear first direction rotation, and said variable drive gear second direction rotation, to drive one or more bidirectional transfer gears, a bidirectional idler shaft, a bidirectional output means, and said output shaft at a geared-neutral, non-rotating velocity, when said input drive gear first direction speed and said variable drive gear second direction speed are equal;
said translating means to translate said input drive gear first direction rotation, and said variable drive gear second direction rotation, to drive said bidirectional transfer gears, said bidirectional idler shaft, said bidirectional output means, and said output shaft, at infinitely variable bidirectional angular velocities, when said input drive gear first direction speed and said variable drive gear second direction speed differ.

18. The gear train as claimed in claim 17, further including a central axis, wherein the bidirectional output means rotates around the central axis.

19. The gear train as claimed in claim 18, wherein the bidirectional output means rotating around the central axis is a bidirectional output gear.

* * * * *